US008559960B2

(12) United States Patent
Gupta et al.

(10) Patent No.: US 8,559,960 B2
(45) Date of Patent: *Oct. 15, 2013

(54) PBX MOBILITY SYSTEM WITH MULTIPLE CALL LEGS

(75) Inventors: Abhinav Gupta, Kitchener (CA); Richard George, Waterloo (CA)

(73) Assignee: Blackberry Limited, Waterloo (CA)

( * ) Notice: Subject to any disclaimer, the term of this patent is extended or adjusted under 35 U.S.C. 154(b) by 11 days.

This patent is subject to a terminal disclaimer.

(21) Appl. No.: 13/481,901

(22) Filed: May 28, 2012

(65) Prior Publication Data

US 2012/0238276 A1   Sep. 20, 2012

Related U.S. Application Data

(63) Continuation of application No. 12/393,334, filed on Feb. 26, 2009, now Pat. No. 8,208,931.

(51) Int. Cl.
*H04W 40/24* (2009.01)
(52) U.S. Cl.
USPC .......................... 455/445; 370/352; 370/432
(58) Field of Classification Search
USPC ................... 455/445; 370/352, 432
See application file for complete search history.

(56) References Cited

U.S. PATENT DOCUMENTS

| 2007/0070980 A1* | 3/2007 | Phelps et al. .................. 370/352 |
| 2007/0223509 A1* | 9/2007 | Chatterjee et al. ............. 370/432 |
| 2007/0223679 A1* | 9/2007 | Chatterjee et al. ........ 379/211.02 |
| 2008/0022014 A1* | 1/2008 | Peters et al. .................. 709/246 |

FOREIGN PATENT DOCUMENTS

EP        1959608 A1 *  8/2008

* cited by examiner

*Primary Examiner* — Meless N Zewdu
*Assistant Examiner* — Jean Chang
(74) *Attorney, Agent, or Firm* — Ridout & Maybee LLP

(57) ABSTRACT

A private branch exchange (PBX) mobility system and associated method for re-using of call legs in an enterprise system. The enterprise system includes a session management platform (SMP) having a private branch exchange (PBX) mobility enabler, the PBX mobility enabler having third-party control communications to one or more PBXs over a session control interface, such as a Session Initiation Protocol (SIP) interface. The PBXs are in communication with one or more media servers. The PBX mobility enabler is configured to provide control communications to the PBXs over the session control interfaces to re-use a wireless call leg and connect to other call legs.

18 Claims, 8 Drawing Sheets

PBX MOBILITY SYSTEM WITH MULTIPLE CALL LEGS

CROSS REFERENCE TO RELATED APPLICATIONS

This application is a continuation of U.S. patent application Ser. No. 12/393,334 filed Feb. 26, 2009, hereby incorporated by reference in its entirety.

FIELD

The present application relates to enterprise systems, and in particular to private branch exchange (PBX) mobility systems having multiple call legs.

BACKGROUND

Enterprise systems generally refer to systems, typically associated with a company or enterprise, which handle the control and communications between wireless, cellular, phone, data, and Internet. Private Branch eXchange (PBX) Mobility is a specific implementation of Fixed Mobile Convergence (FMC) which assists wireless device users in extending an enterprise line (e.g. present on users' desk-phones) to the users' wireless devices. This allows the users to be accessible over their enterprise line even when they are not near their desk-phones.

In some wireless cellular systems, in order to place a call on hold and establish a second call, the same network resource (e.g. allocated channel) is used. However, the second call requires establishment of a second call leg over that same network resource.

There are some conventional FMC systems which provide for connection of calls. In order to do so, a second cellular call is initiated to/by the wireless cellular device. Placing a second cellular call to/from the wireless device is more expensive (up to twice the "cost", in either network usage or monetary dollars) and hence not preferred. Additionally, having the calls active on two different cellular calls to the wireless device presents difficulty to the user in merging the calls into an impromptu ad-hoc conference.

Another difficulty with some conventional systems is that the FMC server may also be responsible for media handling (i.e., for exchanging media information between the multiple devices). This may require complexity in configuration as well as additional communication/control interfaces at the FMC server. Further, it may be difficult to provide scalability to such systems.

It would be advantage to provide a system to address at least some of the above-noted difficulties.

BRIEF DESCRIPTION OF THE DRAWINGS

Reference will now be made, by way of example, to the accompanying drawings which show example embodiments, and in which.

Similar reference numerals may have been used in different figures to denote similar components.

DESCRIPTION OF EXAMPLE EMBODIMENTS

Figure 1:
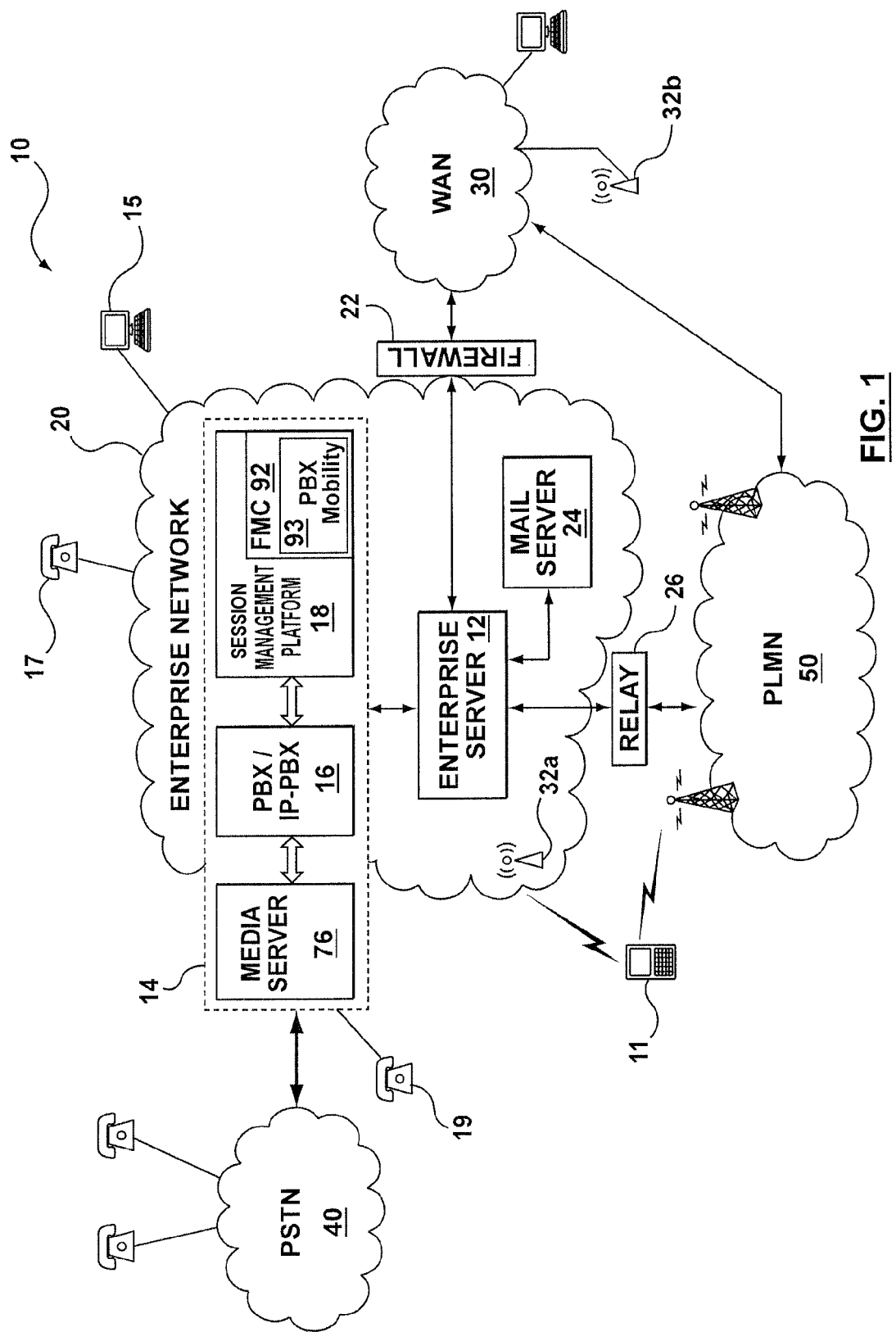
FIG. 1 shows, in block diagram form, an example system for managing enterprise-related mobile calls, including an enterprise communications platform.

In an example embodiment, there is generally provided a session management platform (SMP) which re-uses at least part of an existing cellular call leg to a mobile device to establish a second call to a second destination. The SMP provides multiple logical enterprise lines over a wireless interface to the mobile device.

In another aspect, there is provided a method for re-using of call legs in an enterprise system, the enterprise system including a session management platform (SMP) having control communications to one or more private branch exchanges (PBXs) using third-party call control over a session control interface to each PBX, the PBXs being in communication with one or more media servers, the method being implemented by control communications from the SMP to the PBXs over the session control interface. The method includes creating a first call leg to a wireless device over a wireless network wherein media terminates on one of the media servers and call control signaling terminates on the SMP, creating a second call leg to a first destination wherein media terminates on one of the media servers and call control signaling terminates on the SMP, the SMP utilizing third-party call control of the media servers to connect the respective media of the first call leg and second call leg together thereby establishing a first call session, and creating a third call leg to a second destination wherein media terminates on one of the media servers and call control signaling terminates on the SMP, the SMP utilizing third-party call control of the media servers to connect the respective media of the first call leg and third call leg together thereby establishing a second call session.

In yet another aspect, there is provided a session management platform (SMP) for re-using of call legs. The SMP includes a private branch exchange (PBX) mobility enabler having control communications to one or more private branch exchanges (PBXs) using third-party call control over a session control interface to each PBX, the PBXs being in communication with one or more media servers. The PBX mobility enabler is configured to provide control communications to the PBXs over the session control interface to: create a first call leg to a wireless device over a wireless network wherein media terminates on one of the media servers and call control signaling terminates on the SMP, create a second call leg to a first destination wherein media terminates on one of the media servers and call control signaling terminates on the SMP, the SMP utilizing third-party call control of the media servers to connect the respective media of the first call leg and second call leg together thereby establishing a first call session, and create a third call leg to a second destination wherein media terminates on one of the media servers and call control signaling terminates on the SMP, the SMP utilizing third-party call control of the media servers to connect the respective media of the first call leg and third call leg together thereby establishing a second call session.

In yet another aspect, there is provided an enterprise system for re-using of call legs, including: one or more media servers, one or more private branch exchanges (PBXs) in communication with the media servers, a session management platform (SMP) having control communications to each of the PBXs over a session control interface. The SMP is configured to provide control communications to the PBXs over the session control interface to: create a first call leg to a wireless device over a wireless network wherein media terminates on one of the media servers and call control signaling terminates on the SMP, create a second call leg to a first destination wherein media terminates on one of the media servers and call control signaling terminates on the SMP, the SMP utilizing third-party call control of the media servers to connect the respective media of the first call leg and second call leg together thereby establishing a first call session, and create a third call leg to a second destination wherein media terminates on one of the media servers and call control signaling terminates on the SMP, the SMP utilizing third-party call control of the media servers to connect the respective media of the first call leg and third call leg together thereby establishing a second call session.

Other aspects and examples will be apparent to those of ordinary skill in the art from a review of the following detailed description in conjunction with the drawings.

Present example embodiments are not limited to any particular operating system, mobile device architecture, server architecture, or computer programming language.

Example embodiments relates to the control and management of communications made across multiple call legs. Although reference may be made to "calls" in the description of example embodiments below, it will be appreciated that the described systems and methods are applicable to session-based communications in general and not limited to voice calls. Reference to calls may for example include voice calls as well as media sessions which may for example include video and/or audio. It will also be appreciated that the systems and methods may not be limited to sessions and may be applicable to messaging-based communications in some embodiments. Reference to "media" herein may be understood by those skilled in the art to include a media session.

Reference is now made to FIG. 1, which shows, in block diagram form, an example system, generally designated 10, for the control and management of communications. The system 10 includes an enterprise or business system 20, which in many embodiments includes a local area network (LAN). In the description below, the enterprise or business system 20 may be referred to as an enterprise network 20. It will be appreciated that the enterprise network 20 may include more than one network and may be located in multiple geographic areas in some embodiments.

The enterprise network 20 may be connected, often through a firewall 22, to a wide area network (WAN) 30, such as the Internet. The enterprise network 20 may also be connected to a public switched telephone network (PSTN) 40 via direct inward dialing (DID) trunks or primary rate interface (PRI) trunks.

The enterprise network 20 may also communicate with a public land mobile network (PLMN) 50, which may also be referred to as a wireless wide area network (WWAN) or, in some cases, a cellular network. The connection with the PLMN 50 may be made via a relay 26, as known in the art.

The enterprise network 20 may also provide a wireless local area network (WLAN) 32a featuring wireless access points. Other WLANs 32 may exist outside the enterprise network 20. For example, WLAN 32b may be connected to WAN 30.

The system 10 may include a number of enterprise-associated mobile devices 11 (only one shown). The mobile devices 11 may include devices equipped for cellular communication through the PLMN 50, mobile devices equipped for Wi-Fi communications over one of the WLANs 32, or dual-mode devices capable of both cellular and WLAN communications. WLANs 32 may be configured in accordance with one of the IEEE 802.11 specifications.

It will be understood that the mobile devices 11 include one or more radio transceivers and associated processing hardware and software to enable wireless communications with the PLMN 50 and/or one of the WLANs 32. In various embodiments, the PLMN 50 and mobile devices 11 may be configured to operate in compliance with any one or more of a number of wireless protocols, including GSM, GPRS, CDMA, EDGE, UMTS, EvDO, HSPA, 3GPP, or a variety of others. It will be appreciated that the mobile device 11 may roam within the PLMN 50 and across PLMNs, in known manner, as the user moves. In some instances, the dual-mode mobile devices 11 and/or the enterprise network 20 are configured to facilitate roaming between the PLMN 50 and a WLAN 32, and are thus capable of seamlessly transferring sessions (such as voice calls) from a connection with the cellular interface of the dual-mode device 11 to the WLAN 32 interface of the dual-mode device 11, and vice versa.

The enterprise network 20 typically includes a number of networked servers, computers, and other devices. For example, the enterprise network 20 may connect one or more desktop or laptop computers 15 (one shown). The connection may be wired or wireless in some embodiments. The enterprise network 20 may also connect to one or more digital telephone sets 17 (one shown).

The enterprise network 20 may include one or more mail servers, such as mail server 24, for coordinating the transmission, storage, and receipt of electronic messages for client devices operating within the enterprise network 20. Typical mail servers include the Microsoft Exchange Server™ and the IBM Lotus Domino™ server. Each user within the enterprise typically has at least one user account within the enterprise network 20. Associated with each user account is message address information, such as an e-mail address. Messages addressed to a user message address are stored on the enterprise network 20 in the mail server 24. The messages may be retrieved by the user using a messaging application, such as an e-mail client application. The messaging application may be operating on a user's computer 15 connected to the enterprise network 20 within the enterprise. In some embodiments, the user may be permitted to access stored messages using a remote computer, for example at another location via the WAN 30 using a VPN connection. Using the messaging application, the user may also compose and send messages addressed to others, within or outside the enterprise network 20. The messaging application causes the mail server 24 to send a composed message to the addressee, often via the WAN 30.

The relay 26 serves to route messages received over the PLMN 50 from the mobile device 11 to the corresponding enterprise network 20. The relay 26 also pushes messages from the enterprise network 20 to the mobile device 11 via the PLMN 50.

The enterprise network 20 also includes an enterprise server 12. Together with the relay 26, the enterprise server 12 functions to redirect or relay incoming e-mail messages addressed to a user's e-mail address within the enterprise network 20 to the user's mobile device 11 and to relay incoming e-mail messages composed and sent via the mobile device 11 out to the intended recipients within the WAN 30 or elsewhere. The enterprise server 12 and relay 26 together facilitate "push" e-mail service for the mobile device 11 enabling the user to send and receive e-mail messages using the mobile device 11 as though the user were connected to an e-mail client within the enterprise network 20 using the user's enterprise-related e-mail address, for example on computer 15.

As is typical in many enterprises, the enterprise network 20 includes a Private Branch eXchange (although in various embodiments the PBX may be a standard PBX or an IP-PBX, for simplicity the description below uses the term PBX to refer to both) 16 having a connection with the PSTN 40 for routing incoming and outgoing voice calls for the enterprise. The PBX 16 is connected to the PSTN 40 via DID trunks or PRI trunks, for example. The PBX 16 may use ISDN signaling protocols for setting up and tearing down circuit-switched connections through the PSTN 40 and related signaling and communications. In some embodiments, the PBX 16 may be connected to one or more conventional analog telephones 19. The PBX 16 is also connected to the enterprise network 20 and, through it, to telephone terminal devices, such as digital telephone sets 17, softphones operating on computers 15, etc. Within the enterprise, each individual may have an associated extension number, sometimes referred to as a PNP (private numbering plan), or direct dial phone number. Calls outgoing from the PBX 16 to the PSTN 40 or incoming from the PSTN 40 to the PBX 16 are typically circuit-switched calls. Within the enterprise, e.g. between the PBX 16 and terminal devices, voice calls are often packet-switched calls, for example Voice-over-IP (VoIP) calls. As shown, a media server 76 is in communication with the PBX 16, and in some example embodiments the media server 76 is controlled by the PBX.

The enterprise network 20 may further include a Session Management Platform (SMP) 18 for performing some aspects of messaging or session control, like call control and advanced call processing features. The SMP 18 includes a Fixed Mobile Convergence (FMC) enabler 92 (sometimes conveniently referred to as "FMC server" 92), which includes a PBX Mobility enabler 93 (sometimes conveniently referred to as "PBX Mobility server" 93). Collectively the SMP 18, PBX 16 and media server 76 may be referred to as the enterprise communications platform, generally designated 14. It will be appreciated that the enterprise communications platform 14 and, in particular, the SMP 18, is implemented on one or more servers having suitable communications interfaces for connecting to and communicating with the PBX 16 and/or DID/PRI trunks. Although the SMP 18 may be implemented on a stand-alone server, it will be appreciated that it may be implemented into an existing control agent/server as a logical software component. As will be described below, the SMP 18 may be implemented as a multi-layer platform.

The enterprise communications platform 14 implements the switching to connect call legs/sessions and may provide the conversion between, for example, a circuit-switched call and a VoIP call, or to connect legs of other media sessions. In some embodiments, in the context of voice calls the enterprise communications platform 14 provides a number of additional functions including automated attendant, interactive voice response, call forwarding, voice mail, etc. It may also implement certain usage restrictions on enterprise users, such as blocking international calls or 1-900 calls. In many embodiments, Session Initiation Protocol (SIP) may be used to set-up, manage, and terminate media sessions for voice calls.

Other protocols may also be employed by the enterprise communications platform 14, for example, Web Services, Computer Telephony Integration (CTI) protocol, Session Initiation Protocol for Instant Messaging and Presence Leveraging Extensions (SIMPLE), and various custom Application Programming Interfaces (APIs), as will be described in greater detail below.

One of the functions of the enterprise communications platform 14 is to extend the features of enterprise telephony to the mobile devices 11. For example, the enterprise communications platform 14 may allow the mobile device 11 to perform functions akin to those normally available on a standard office telephone, such as the digital telephone set 17 or analog telephone set 15. Example features may include direct extension dialing, enterprise voice mail, conferencing, call transfer, call park, etc.

Figure 2:
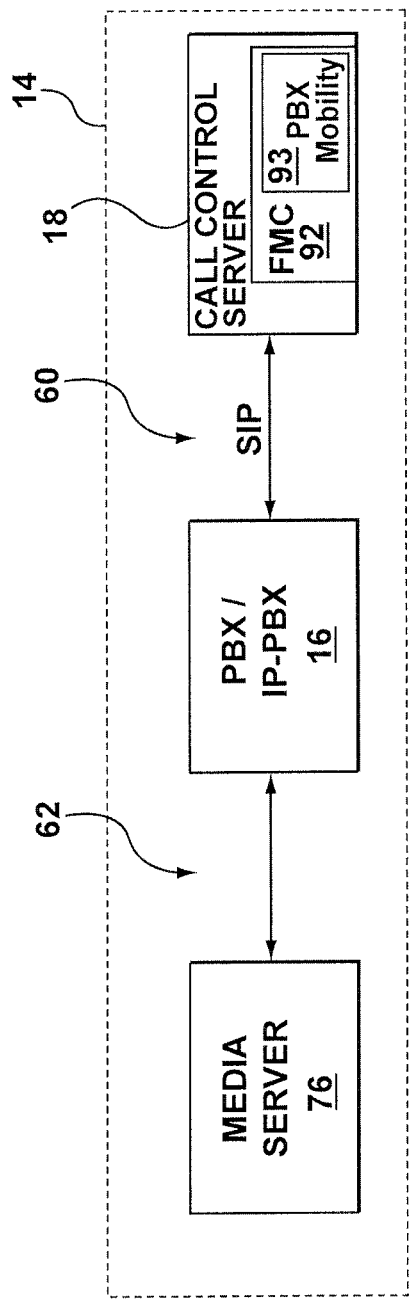
FIG. 2 shows, in block diagram form, further details of an enterprise communications platform in accordance with an example embodiment.
Figure 3:
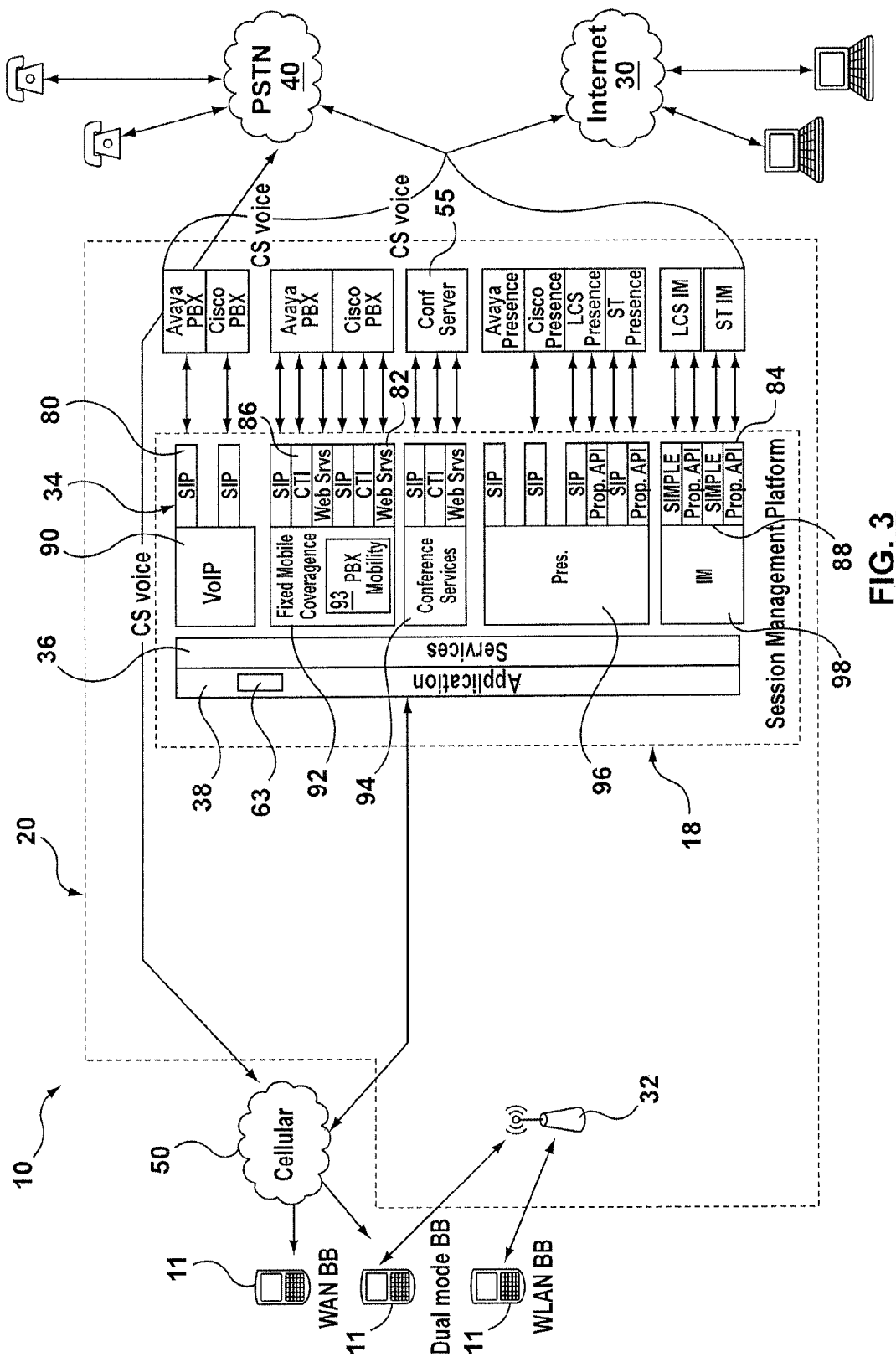
FIG. 3 shows furthers detail of the enterprise communications platform of FIG. 2 in accordance with an example embodiment.

Reference is now made to FIGS. 2 to 3, which show example embodiments of the enterprise communications system 14. Again, although references are made below to "calls" or call-centric features it will be appreciated that the architectures and systems depicted and described are applicable to session-based communications in general and, in some instances, to messaging-based communications.

FIG. 2 shows an example embodiment in which the PBX 16 performs the functions of terminating and/or bridging media, but third-party call control functions are largely handled by the SMP 18. In this embodiment, the SMP 18 may be referred to as a third-party call control server 18. This architecture may be referred to as "Third-Party Call Control".

The third-party call control server 18, which includes the FMC 92, and which further includes the PBX Mobility 93. The third-party call control server 18 is coupled to the PBX 16, for example through the LAN, enabling packet-based communications and, more specifically, IP-based communications. In one embodiment, communications between the PBX 16 and the third-party call control server 18 are carried out in accordance with SIP. In other words, the third-party call control server 18 uses SIP-based communications to manage the set up, tear down, and control of media handled by the PBX 16. The PBX 16 is further coupled to the media server 76. The PBX 16 interacts with the media server 76 using media handling commands. For example, the PBX 16 and media server 76 may communicate using Media Server Markup Language (MSML) as defined in IETF document Saleem A., "Media Server Markup Language", Internet Draft, draft-saleem-msml-07, Aug. 7, 2008. The media server 76 may be configured to perform Host Media Processing (HMP). The media server 76 further includes a media gateway for interfacing between networks having different network protocols, and for providing some of the functionality of the media server 76 described herein.

As can be appreciated, in some example embodiments only a single session control interface, shown as SIP interface 60 is required between the SMP 18 (or FMC 92) and the PBX 16. The specific call control and logic functionality would be implemented by the SMP 18 and communicated over the SIP interface 60. Thus, in order to provide some of the example implementations described herein, the specific interface 62 between the PBX 16 and the media server 76 is independent of the SIP interface 60, and for example be PBX or manufacturer-specific. As much of the logic is provided by the SMP 18 to control the PBX 16, this configuration may be referred to as "Third-party Call Control". In some example embodiments, this provides a flexibility in system design such that the PBX 16 and media server 76 could be readily substituted without onerous (or any) configuration of the SIP interface 60 and associated session control signaling.

It can be appreciated that, in some example embodiments, other types of session protocols may be used by the third-party call control server 18 (and PBX Mobility server 93) over the SIP interface 60. In some example embodiments, the third-party call control server 18 may include H.323 or Computer Telephony Integration (CTI), or communications protocol conforming to the ECMA-269 or ECMA-323 standards for Computer Supported Telecommunications Applications (CSTA).

Other architectures or configurations for the enterprise communications system 14 will be appreciated by those ordinarily skilled in the art.

Reference is now made to FIG. 3, which shows a detailed example embodiment of the enterprise communications system 14 with a Third-party Call Control architecture. As shown, the SMP 18 is a multi-layer platform that includes a protocol layer 34, a services layer 36 and an application layer 38. The protocol layer 34 includes a plurality of interface protocols configured for enabling operation of corresponding applications in the application layer 38. The services layer 36 includes a plurality of services that can be leveraged by the interface protocols to create richer applications. Finally, the application layer 38 includes a plurality of applications that are exposed out to the communication devices and that leverage corresponding ones of the services and interface protocols for enabling the applications.

Specifically, the protocol layer 34 preferably includes protocols which allow media to be controlled separate from data. For example, the protocol layer 34 can include, among other things, a Session Initiation Protocol or SIP 80, a Web Services protocol 82, an Application Programming Interface or API 84, a Computer Telephony Integration protocol or CTI 86, and a Session Initiation Protocol for Instant Messaging and Presence Leveraging Extensions (SIMPLE) protocol 88. It is contemplated that the interface protocols 80, 82, 84, 86, 88 are plug-ins that can interface directly with corresponding servers in the enterprise network 20, which will be further described below.

For the purposes of this disclosure, SIP 80 will be utilized, although it is appreciated that the system 10 can operate using the above disclosed or additional protocols. As known by those of ordinary skill in the art, SIP is the IETF (Internet Engineering Task Force) standard for multimedia session management, and more specifically is an application-layer control protocol for establishing, maintaining, modifying and terminating multimedia sessions between two or more end-points. As further known by those of ordinary skill in the art, the SIP protocol 80 includes two interfaces for signaling: SIP-Trunk (hereinafter referred to as "SIP-T") and SIP-Line (hereinafter referred to as "SIP-L"). Specifically, the SIP-T interface is utilized when the endpoint is a non-specific entity or not registered (i.e., when communicating between two network entities). In contrast, the SIP-L interface is utilized when the endpoint is registered (i.e., when dialing to a specific extension). The specific operation of the system 10 utilizing SIP 80 will be described in further detail below.

The SMP 18 also includes a plurality of enablers, among other things, a VoIP enabler 90, the FMC enabler 92 (which includes the PBX Mobility enabler 93), a conference services enabler 94, a presence enabler 96 and an Instant Messaging or IM enabler 98. Each of the enablers 90, 92, 94, 96, 98 are used by corresponding services in the services layer 36 that combine one or more of the enablers. Each of the applications in the application layer 38 is then combined with one or more of the services to perform the desired application. For example, a phone call service may use the VoIP or PBX enabler, and an emergency response application may use the phone call service, an Instant Messenger service, a video call service, and email service and/or a conference service.

The application layer 38 may include a conference services application 63 that, together with the conference services enabler 94, enables multiple communication devices (including desk telephones and personal computers) to participate in a conference call through use of a centralized conference server 55. As seen in FIG. 3, the conference server 55 is provided in the enterprise network 20 and is in communication with the conference services enabler 94 preferably through the SIP protocol 80, although it is recognized that additional protocols that control media separate from data may be appropriate, such as the Web Services protocol 82 or the CTI protocol 86. As will be described in further detail below, the conference call server 55 is configured for directing media and data streams to and from one or more communication devices (i.e., mobile devices 11, telephones 17, and computers 15). The media server 76 (not shown in FIG. 3) would be located as in FIGS. 1 and 2.

Figure 4:
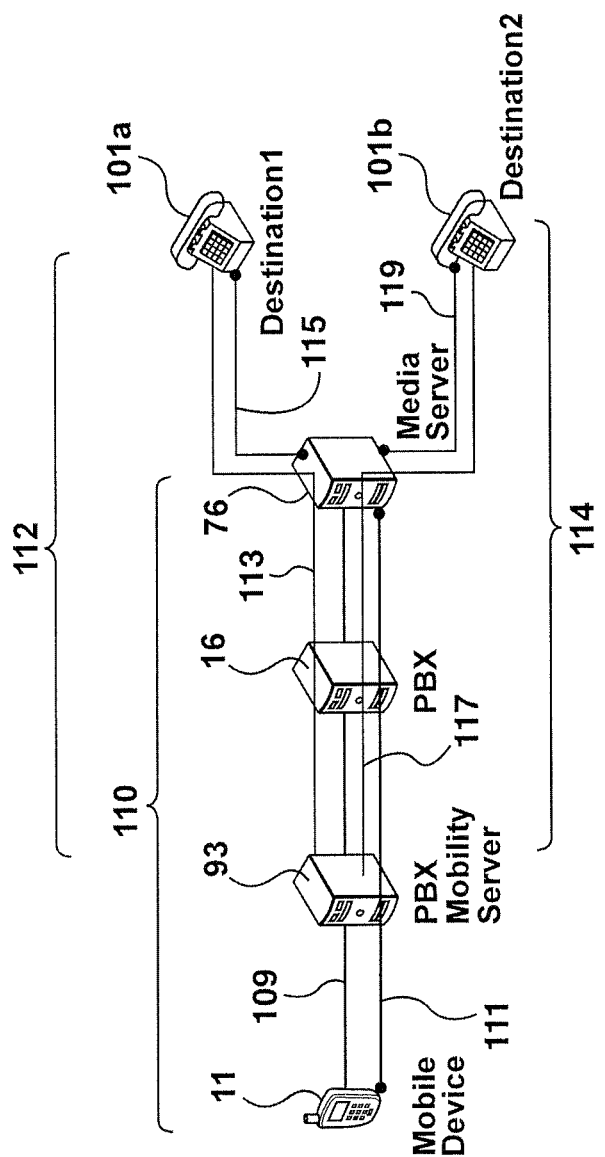
FIG. 4 shows a call diagram implemented in the system having multiple call legs in accordance with an example embodiment.

Reference is now made to FIG. 4, which shows a call diagram implemented in the system 10 which generally provides re-use of a cellular call leg in accordance with an example embodiment. Example implementations or variants include but are not limited to three way call, call waiting, hold, and forward (as would be understood in a conventional PSTN system). In the example shown, the mobile device 11 desires to implement a call to destination1 (101a) as well as destination2 (101b). Destination1 (101a) and destination2 (101b) are connected through enterprise lines (e.g., present on a user's desk-phone, for example over the PSTN 40). The mobile device 11 communicates in the cellular network (PLMN 50, FIG. 1). The PBX Mobility server 93 assists in facilitating the connectivity between call leg1 (110), call leg2 (112) and call leg3 (114). Call leg1 (110) includes a call control signal 109, and further includes media 111 which terminates on the media server 76. Call leg2 (112) includes a call control signal 113 which terminates on the PBX Mobility server 93, and further includes media 115 which terminates on the media server 76. Call leg3 (114) includes a call control signal 117 which terminates on the PBX Mobility server 93, and further includes media 119 which terminates on the media server 76. In the example embodiment shown, only one call leg is required for call leg1 (110), such that call leg1 (110) may be re-used when connected to call leg2 (112) and/or call leg3 (114). In another words, it can be appreciated that in this embodiment another call leg is not created from or to the mobile device 11.

As can be appreciated, some example embodiments are not limited to a mobile device 11 in the cellular network (PLMN 50), but rather the mobile device 11 and call leg1 could be implemented in any number of types of networks, wherein it would be advantageous to re-use a call leg, for example when the particular network has an associated usage cost or for example has relatively low allocated bandwidth.

Figure 5:
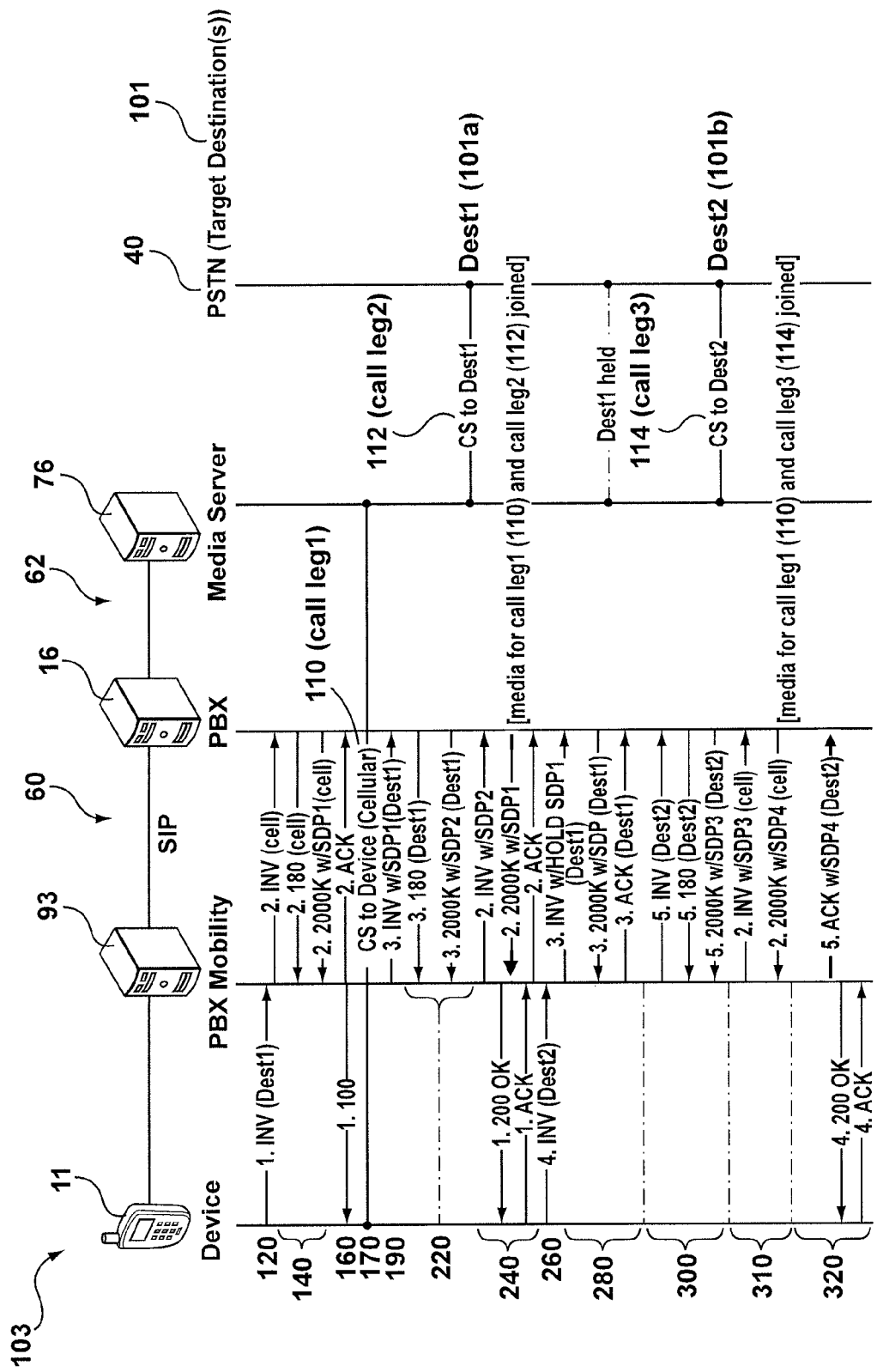
FIG. 5 shows a detailed signaling diagram for implementing the call diagram of FIG. 4.

FIG. 5 shows a detailed signaling diagram 103 for implementing the call of FIG. 4. The signaling descriptions that follow are based on the Third-party Call Control architecture, such as that illustrated in FIGS. 2 and 3. Because only a single SIP interface 60 is used to provide the functionality required, the specific interface 62 between the PBX 16 and the media server 76 is not herein described, but could be readily implemented by those skilled in the art, for example using MSML (described above). As described above, the interface 62 may be specific to the manufacturer PBX 16, or may be readily substituted with another PBX or media server 76 without affecting the signaling described herein.

As shown in FIG. 5, the call originates from one of the mobile devices 11 to the first and second target destinations 101 in the PSTN 40. This may be described as a "mobile originated" call sequence. The signaling diagram 103 generally provides for re-using of the established cellular call leg (call leg1 (110)) to the wireless device 11. Some of the SIP-based messages may contain a Session Description Protocol (SDP) body, as would be understood by those skilled in the art.

At step 120, the mobile device 11 sends a SIP INVITE message to the PBX Mobility server 93 indicating that the mobile device 11 wishes to call number 'Dest1' (corresponding to destination1 (101a), FIG. 4). At step 140, the PBX Mobility server 93 upon receiving this INVITE sends an INVITE for the mobile device's 11 number to the PBX 16. The PBX 16 initially responds back with 180, and subsequently with a 200OK message that contains SDP1. SDP1 contains media descriptions (e.g, including media port of the mobile device 11) for the cellular connection to the mobile device 11 on the media server 76.

At step 160, the PBX Mobility server 93 upon receiving the 200 OK (in step 140 above) sends an ACK to the PBX 16 and further sends a 100 provisional response message to the mobile device 11 confirming that its INVITE (received in step 120) has been received and is being processed. At step 170, the media or cellular call session (within "call leg1" (110)) between the mobile device 11 and the media server 76 is established at this stage.

At step 190, once call leg1 (110) is established, the PBX Mobility server 93 sends an INVITE for (101a) with SDP1 (received in step 140 as payload for 200 OK) to the PBX 16. At step 220, the PBX Mobility server 93 receives 180 (ringing) followed by 200 OK with SDP2 from the PBX 16. These responses are for call leg2 (112) to Dest1 (101a). The SDP2 contains the media descriptions (e.g. including media port) for the destination 'Dest1' (101a) on the media server 76. The call leg2 (112) to the destination 'Dest1' is established at this stage.

At step 240, the PBX Mobility server 93 sends as INVITE with SDP2 (received in step 220 above) to the PBX 16 and thereafter receives a 200OK with SDP1 from the PBX 16. The PBX Mobility server 93 thereafter sends an ACK to the PBX 16 to acknowledge the receipt of the 200 OK.

The two call legs, call leg1 (110) and call leg2 (112), are joined at this stage as a call session as a result of SDP shuffling, and a PBX anchored cellular call is established. As would be understood by those skilled in the art, SDP shuffling includes utilizing the SDP contained in a received offer for one of the call legs (call leg1) for SIP offer-answer negotiation to be sent in the offer in another call leg (call leg2) during SIP offer-answer negotiation, and similarly utilizing the received SDP answer received in call leg2 as sent answer for call leg1, thereby joining the media from the two call legs (call leg1 and call leg2) together—establishing an end to end call. The media information for the call is anchored at the media server 76. PBX Mobility server 93 sends a 200 OK to the mobile device 11, and receives an ACK.

At step 260, the mobile device 11 sends another SIP INVITE message to the PBX Mobility server 93 indicating its intent to call destination 'Dest2' (101b). The PBX Mobility server 93 upon reception of this INVITE identifies that a call is already established for this wireless device 11, and may proceed to put the existing destination 'Dest1' (101a) on hold. Thus, at step 280, PBX Mobility server 93 sends an INVITE with hold SDP (created based on cached information on the PBX Mobility server 93 for SDP1) to the PBX 16 for destination 'Dest1' (101a). This puts the call leg2 (112) to the destination 'Dest1' (101a) on hold.

Still referring to step 280, the PBX 16 responds back with 200OK with SDP to confirm that hold of call leg2 (112) has succeeded. The PBX Mobility server 93 acknowledges the 200OK by sending an ACK to the PBX 16.

At step 300, the PBX Mobility server 93 sends another delayed offer INVITE to the PBX 16 to call destination 'Dest2' (101b). The PBX 16 initially responds back with a 180 (ringing) and finally with a 200 OK with SDP3 as payload for this media session (within call leg3 (114)). The SDP3 carries the media description for Dest2 (101b) at the media server 76. Call leg3 (114) to 'Dest2' is established.

At step 310, the PBX Mobility server 93 sends a Re-INVITE with SDP3 (received in step 300) to the PBX 16 on the call leg1 (110) to mobile device 11. The PBX 16 responds back to the Re-INVITE with 200 OK with SDP4 that carries updated media description for call leg1 (110) to the mobile device 11 at the media server 76.

At step 320, PBX Mobility server 93 sends an ACK message carrying the SDP4 (received in step 310) for the call leg3 (114) for 'Dest2' (101b) to the PBX 16. The media of the two call legs, call leg1 (110) and call leg3 (114) are connected as a call session at this stage due to SDP shuffling with media being anchored at the media server 76. Dest1 (101a) is on hold in the background. The PBX Mobility server 93 sends a 200 OK to the mobile device 11 and receives an ACK for the same.

The above may be used to provide a conference call (or multi-party call or three-way call) between the mobile device 11, dest1 (101a) and dest2 (101b). This is accomplished by joining call leg1 (110), call leg2 (112), and call leg3 (114) with the PBX Mobility server 93 using Third-party Call Control over the PBX 16 with media being mixed at the media server 76. As would be understood by those skilled in the art, reference to mixing of media includes mixing media from two or more sources, and for example refers to conference server applications where media from multiple parties is mixed to start a conference bridge.

The above signaling diagram 103 is referred to as a "Mobile Originated PBX Initiated (MOPI)" call sequence. Alternatively, the call sequence could be Mobile Originated Mobile Initiated (MOMI), Mobile Terminated PBX Initiated (MTPI), or Mobile Terminated Mobile Initiated (MTMI), as would be understood by those skilled in the art. Thus, reference to "from" or "to" in regards to signaling and communication paths in various embodiments may in fact be reversed to be "to" or "from", as appropriate. In some further example embodiments, some or all of the above signaling sequence(s) is originated or initiated by the destination devices dest1 (101a) or dest2 (101b).

Either the mobile device 11 or the PBX Mobility server 93 may terminate the call session(s). Similarly, one of the target destination(s) 101 may terminate the call, which may terminate the respective call leg2 (112) or call leg3 (114) without terminating the call leg1 (110) if the other call is still active. This may be readily implemented by those skilled in the art in view of the above.

Figure 6:
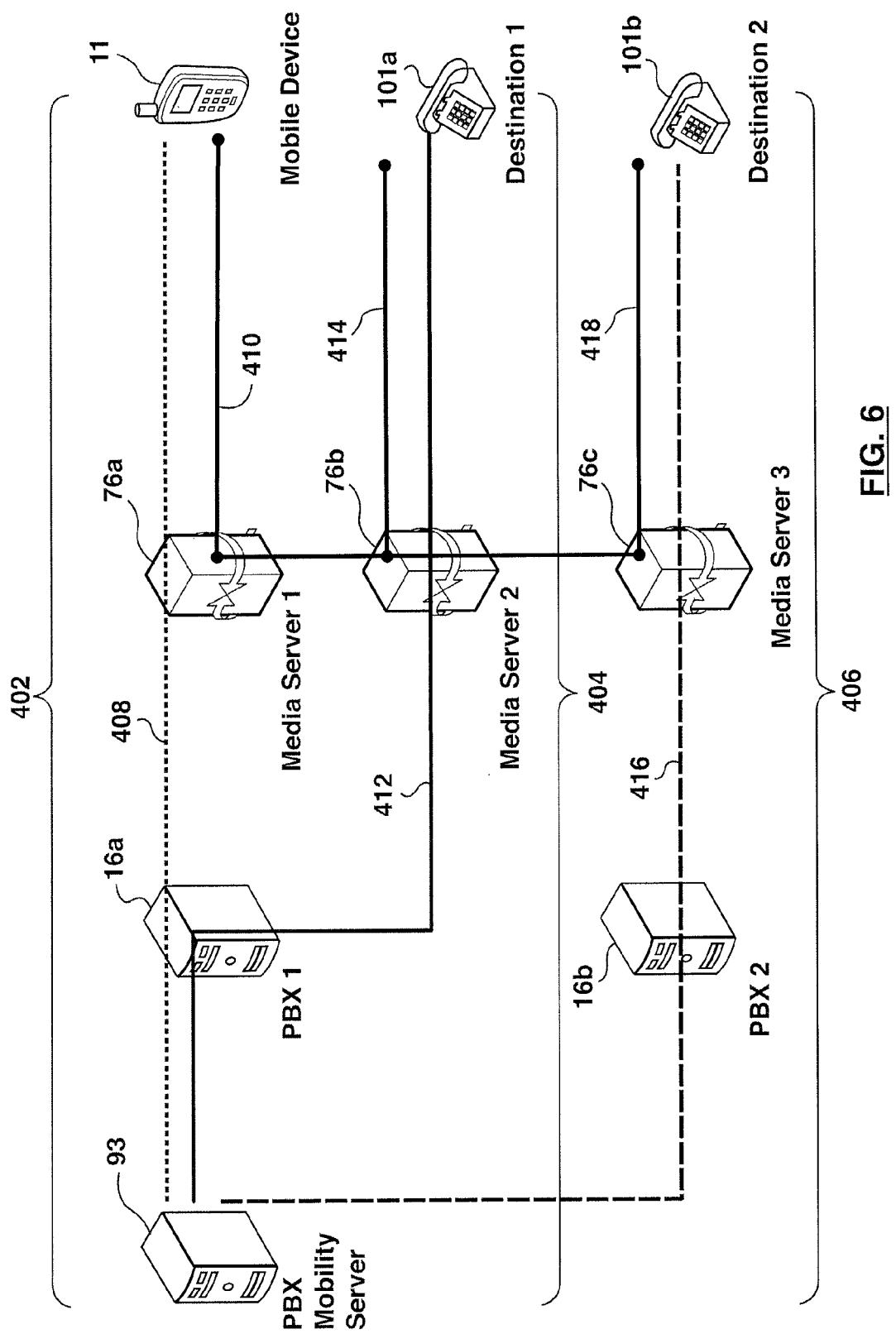
FIG. 6 shows another call diagram implemented in the system having multiple call legs in accordance with another example embodiment.

Reference is now made to FIG. 6, which illustrates a call diagram implemented in the system 10 in accordance with another example embodiment. The same reference numbers of the system 10 will be used for reference to various elements for convenience, without intending to be limiting. The call diagram of FIG. 6 generally provides cellular call leg re-use wherein more than one PBX 16 and/or more than one media server 76 may be provided. As shown, there is provided PBX1 (16a) and PBX2 (16b), as well as Media Server1 (76a), Media Server2 (76b), and Media Server3 (76c). The PBX Mobility server 93 includes a single control interface to each of PBX1 (16a) and PBX2 (16b). PBX1 (16a) is associated and has control communication with Media Server1 (76a) and Media Server2 (76b). PBX2 (16b) is associated and has control communication with Media Server3 (76c). The specific communication protocols as between the media servers 76a, 76b, 76c are not described herein as they would be readily implemented by those skilled in the art. In the example shown, the mobile device 11 desires to implement a call to destination1 (101a) as well as destination2 (101b). The PBX Mobility server 93 assists in facilitating the connectivity between call leg1 (402), call leg2 (404) and call leg3 (406). Call leg1 (402) includes a call control signal 408 which terminates on the PBX Mobility server 93, and further includes media 410 which terminates on the media server 76. Call leg2 (404) includes a call control signal 412 which terminates on the PBX Mobility server 93, and further includes media 414 which terminates on the media server 76. Call leg3 (406) includes a call control signal 416 which terminates on the PBX Mobility server 93, and further includes media 418 which terminates on the media server 76. In the example embodiment shown, only one call leg is required for call leg1 (402), such that call leg1 (402) (or a part thereof such as the media 410) may be re-used when connected to call leg2 (404) and/or call leg3 (406).

Figure 7:
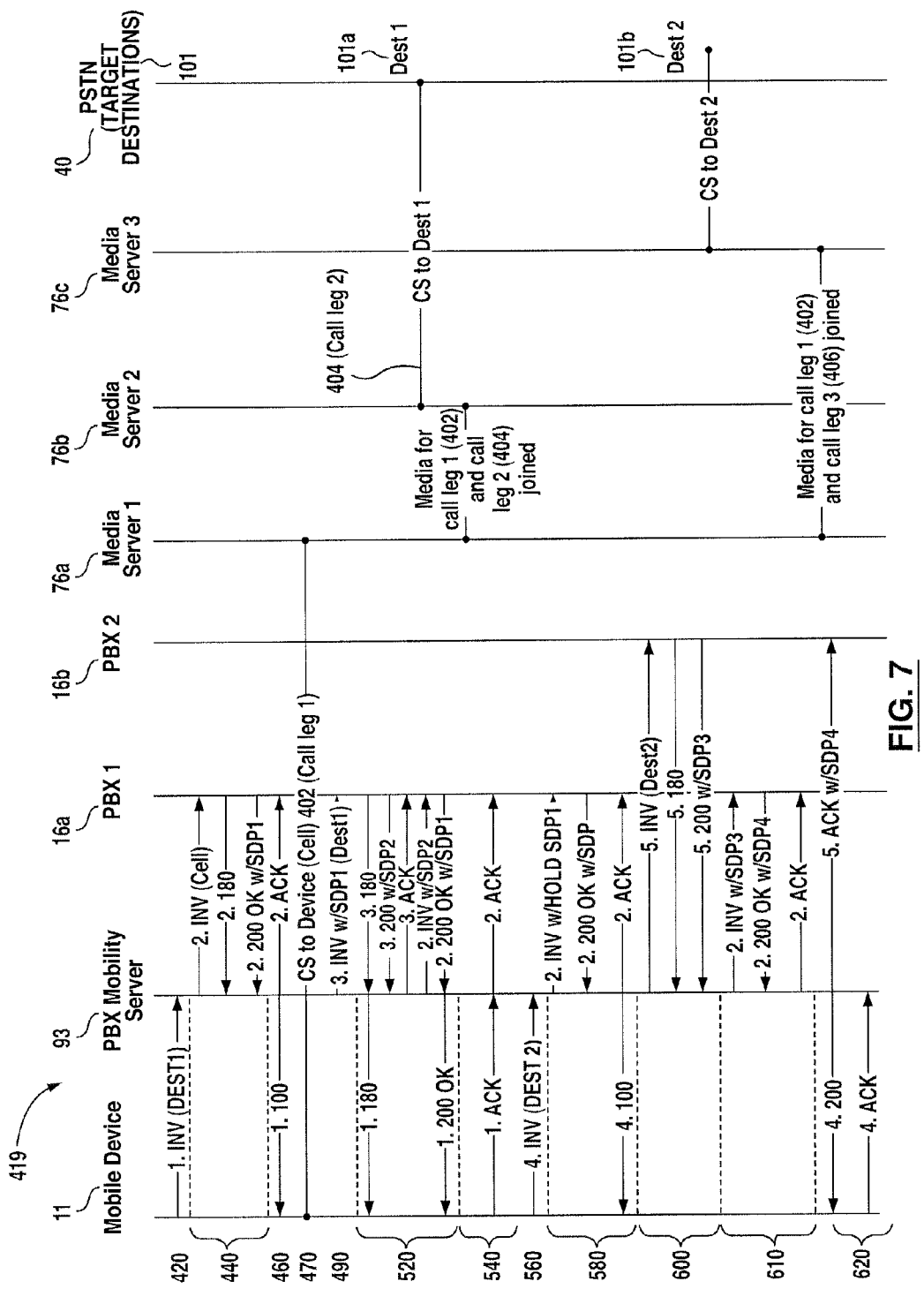
FIG. 7 shows a detailed signaling diagram for implementing the call diagram of FIG. 6, illustrating a Mobile Originated PBX Initiated (MOPI) sequence.

FIG. 7 shows a detailed signaling diagram 419 for implementing the call of FIG. 6. As shown in FIG. 7, the call originates from one of the mobile devices 11 to the intended first and second target destinations 101a, 101b in the PSTN 40. The signaling diagram 103 generally provides for re-using of the established cellular call leg (call leg1 (402)) to the wireless device 11.

At step 420, the mobile device 11 sends a SIP INVITE message to the PBX Mobility server 93 indicating that the mobile device 11 wishes to call destination1 (101a). At step 440, the PBX Mobility server 93 upon receiving this INVITE sends an INVITE for the mobile device's 11 number to the PBX1 (16a). The PBX1 (16a) initially responds back with 180 (ringing), and subsequently with a 200OK message that contains SDP1. SDP1 contains media descriptions (e.g., including media port of the mobile device 11) for the cellular connection to the mobile device 11 on media server1 (76a).

At step 460, the PBX Mobility server 93 upon receiving the 200 OK (in step 440 above) sends an ACK to the PBX1 (16a) and further sends a 100 provisional response message to the mobile device 11 confirming that its INVITE (received in step 420) has been received and is being processed. At step 470, the media (included in call leg1 (402)) between the mobile device 11 and the media server1 (76a) is established at this stage (i.e., the media in this example is a cellular call session).

At step 490, once call leg1 (402) is established, the PBX Mobility server 93 sends an INVITE for 'Dest1' (101a) with SDP1 (received in step 440 as payload for 200 OK) to the PBX1 (16a). At step 520, the PBX Mobility server 93 receives 180 (ringing) followed by 200 OK with SDP2 from the PBX1 (16a). The PBX Mobility server 93 sends an ACK to acknowledge the receipt of the 200 OK. The PBX Mobility server 93 sends an INVITE with SDP2 to the PBX1 (16a), and receives as 200 OK with SDP1 from the PBX1 (16a), and the PBX Mobility server 93 further sends a 200 OK to the mobile device 11.

These responses are for call leg2 (404) to Dest1 (101a). The SDP2 contains the media descriptions (e.g. including media port) for the destination 'Dest1' (101a) on the media server2 (76b). The call leg2 (404) including media between media server2 (76b) and the destination Dest1 (101a) is established at this stage.

At step 540, the PBX Mobility server 93 sends an ACK to the PBX1 (16a) to acknowledge the receipt of 200 OK received in step 420 above for Dest1 (101a).

The two call legs, call leg1 (402) and call leg2 (404), are joined at this stage as a call session as a result of SDP shuffling (as described above), and a PBX anchored cellular call is established. The media information for the call is anchored at each of media server1 (76a) and media server2 (76b). Note that further media flow occurs between media server1 (76a) and media server2 (76b), under control from the PBX mobility server 93, as could be implemented by those skilled in the art. The PBX Mobility server 93 sends a 200 OK to the mobile device 11, and receives an ACK.

At step 560, the mobile device 11 sends another SIP INVITE message to the PBX Mobility server 93 indicating its intent to call destination 'Dest2' (101b). The PBX Mobility server 93 upon reception of this INVITE identifies that a call is already established for this wireless device 11, and may proceed to put the existing destination 'Dest1' (101a) on hold. Thus, at step 580, PBX Mobility server 93 sends an INVITE with hold SDP (created based on cached information on the PBX Mobility server 93 for SDP1) to the PBX1 (16a) for destination 'Dest1' (101a). This puts the call leg2 (404) to the destination 'Dest1' (101a) on hold.

Still referring to step 580, the PBX1 (16a) responds back with 200OK with SDP to confirm that hold of call leg1 (112) has succeeded. The PBX Mobility server 93 acknowledges the 200OK by sending an ACK to the PBX1 (16a).

At step 600, the PBX Mobility server 93 sends another delayed offer INVITE to the PBX2 (16b) to call destination 'Dest2' (101b). The PBX 16 initially responds back with a 180 (ringing) and finally with a 200 OK with SDP3 as payload for this call session, being call leg3 (406). The SDP3 carries the media description for Dest2 (101b) at the media server3 (76c). Call leg3 (406) to 'Dest2' is established.

At step 610, the PBX Mobility server 93 sends a Re-INVITE with SDP3 (received in step 600) to the PBX1 (16a) on the call leg1 (402) to mobile device 11. The PBX1 (16a) responds back to the Re-INVITE with 200 OK with SDP4 that carries updated media description for call leg1 (402) to the mobile device 11 at the media server1 (76a).

At step 620, PBX Mobility server 93 sends an ACK message carrying the SDP4 (received in step 610) for the call leg3 (406) for 'Dest2' (101b) to the PBX2 (16b). The two call legs, call leg1 (402) and call leg3 (406) are connected as a call session at this stage due to SDP shuffling with media being anchored at the media server1 (76a) and media server3 (76c). Note that further media communication occurs between media server1 (76a) and media server3 (76c), under control from the PBX Mobility server 93, as could be implemented by those skilled in the art. Dest1 (101a) is on hold in the background. The PBX Mobility server 93 sends a 200 OK to the mobile device 11 and receives an ACK for the same. In some example embodiments Dest1 (101a) may be teleconferenced in by media shuffling as between the media servers 76a, 76b, 76c, as could be appreciated by those skilled in the art.

The above signaling diagram 419 is referred to as a "Mobile Originated PBX Initiated (MOPI)" call sequence. Alternatively, the call sequence could be Mobile Originated Mobile Initiated (MOMI), Mobile Terminated PBX Initiated (MTPI), or Mobile Terminated Mobile Initiated (MTMI), as would be understood by those skilled in the art.

Figure 8:
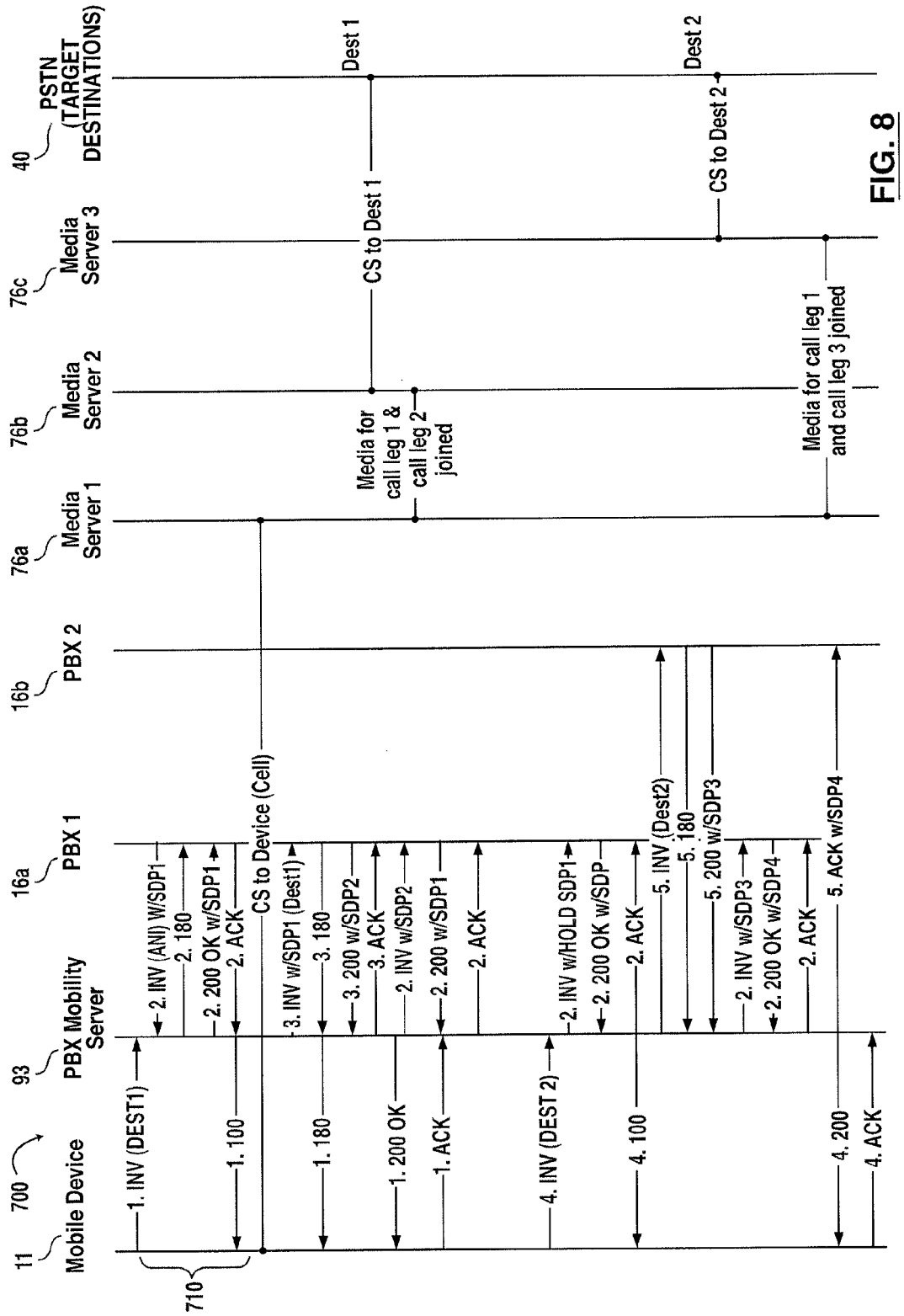
FIG. 8 shows another detailed signaling diagram for implementing the call diagram of FIG. 6, illustrating a Mobile Originated Mobile Initiated (MOMI) sequence.

Thus, reference is now made to FIG. 8, which shows another detailed signaling diagram 700 for implementing the call diagram of FIG. 6, illustrating a Mobile Originated Mobile Initiated (MOMI) sequence. The signaling diagram 700 is similar to the MOPI signaling diagram 419 (FIG. 7). In the example shown, the mobile device 11 originates the call into the PBXs 16. As shown, the first four messages 710 between the PBX Mobility server 93 and the PBX1 (16a) have their direction reversed when compared to the MOPI signaling diagram 419 (FIG. 7). The PBX1 (16a) sends an INVITE for the mobile device's 11 number to the PBX Mobility server 93. The PBX Mobility server 93 initially responds back with 180 (ringing), and subsequently with a 200OK message that contains SDP1. SDP1 contains media descriptions (e.g., including media port of the mobile device 11) for the cellular connection to the mobile device 11 on media server1 (76a). The PBX1 (16a) upon receiving the 200 OK sends an ACK to the PBX Mobility server 93 and the PBX Mobility Server 93 further sends a 100 provisional response message to the mobile device 11 confirming that its INVITE has been received and is being processed.

Although some example embodiments have described the entire call leg as being re-used, it can be appreciated that in some embodiments specific parts of the call leg may be re-used, for example the media or the call control signal. The call control signaling could be re-used for purposes such as establishing another media session based on some of the existing control signaling.

Although systems having three client devices have been described, in some example embodiments, the system may re-use a call leg (or a part thereof) as between more than three client devices, wherein the SMP may be suitably configured by those skilled in the art in view of the above. The multiple devices may further be connected in a conference call by connecting the media of the respective call legs.

Certain adaptations and modifications of the described embodiments can be made. Therefore, the above discussed embodiments are considered to be illustrative and not restrictive.

What is claimed is:

1. A method for re-using of a first call leg in a system having two or more media servers, the system including one or more devices having control communication to one or more private branch exchanges (PBXs) which each interface with at least one of the media servers, the method comprising:
    creating the first call leg to a wireless device over a wireless network wherein first media terminates on any one of the media servers;
    creating a second call leg to a first destination wherein second media terminates on any one of the media servers;
    connecting the respective media of the first call leg and second call leg together thereby establishing a first call session between the wireless device and the first destination;
    creating a third call leg to a second destination wherein third media terminates on any one of the media servers; and
    connecting the respective media of the first call leg and third call leg together thereby establishing a second call session between the wireless device and the second destination, wherein an additional call leg to the wireless device is not created.

2. The method of claim 1, wherein the control communication includes Session Initiation Protocol (SIP)-based communications.

3. The method of claim 1, wherein the wireless network is a public land mobile network (PLMN).

4. The method of claim 1, wherein the wireless network includes an associated usage cost.

5. The method of claim 1, further comprising holding the second call leg prior to creating the third call leg.

6. The method of claim 1, wherein each of the media servers include a media gateway for interfacing between networks.

7. The method of claim 1, wherein the PBXs comprise two or more PBXs.

8. The method of claim 1, wherein the respective media of two of the call legs terminate on different media servers.

9. The method of claim 1, wherein the respective media of each of the call legs terminate on different media servers.

10. A system for re-using of a first call leg, comprising:
    one or more devices having control communications to one or more private branch exchanges (PBXs);
    two or more media servers;
    the one or more PBXs each interface with at least one of the media servers;
    the media servers controlled to:
    create the first call leg to a wireless device over a wireless network wherein first media terminates on any one of the media servers, create a second call leg to a first destination wherein second media terminates on any one of the media servers,
    connect the respective media of the first call leg and second call leg together thereby establishing a first call session between the wireless device and the first destination,
    create a third call leg to a second destination wherein third media terminates on any one of the media servers, and
    connect the respective media of the first call leg and third call leg together thereby establishing a second call session between the wireless device and the second destination, wherein an additional call leg to the wireless device is not created.

11. The system of claim 10, wherein the control communication includes Session Initiation Protocol (SIP)-based communications.

12. The system of claim 10, wherein the wireless network is a public land mobile network (PLMN).

13. The system of claim 10, wherein the wireless network includes an associated usage cost.

14. The system of claim 10, wherein the second call leg is on hold prior to creating the third call leg.

15. The system of claim 10, wherein each of the media servers include a media gateway for interfacing between networks.

16. The system of claim 10, wherein the PBXs comprise two or more PBXs.

17. The system of claim 10, wherein the respective media of two of the call legs terminate on different media servers.

18. The system of claim 10, wherein the respective media of each of the call legs terminate on different media servers.

* * * * *